(12) United States Patent
Levy et al.

(10) Patent No.: US 11,664,568 B2
(45) Date of Patent: May 30, 2023

(54) WAVEGUIDES INCLUDING AT LEAST ONE RIDGE ASSOCIATED WITH AT LEAST ONE DIELECTRIC CORE AND THE WAVEGUIDES ARE SURROUNDED BY A CONDUCTIVE SHELL

(71) Applicant: Intel Corporation, Santa Clara, CA (US)

(72) Inventors: Cooper S. Levy, Portland, OR (US); Chintan S. Thakkar, Portland, OR (US); James E. Jaussi, Hillsboro, OR (US); Bryan K. Casper, Ridgefield, WA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 16/437,245

(22) Filed: Jun. 11, 2019

(65) Prior Publication Data
US 2020/0395649 A1  Dec. 17, 2020

(51) Int. Cl.
*H01P 3/123* (2006.01)
*H04B 1/40* (2015.01)
*H01P 3/16* (2006.01)
*H01P 3/12* (2006.01)

(52) U.S. Cl.
CPC ............. *H01P 3/123* (2013.01); *H01P 3/122* (2013.01); *H01P 3/16* (2013.01); *H04B 1/40* (2013.01)

(58) Field of Classification Search
CPC ................................. H01P 3/122; H01P 3/123
USPC .......................................................... 333/239
See application file for complete search history.

(56) References Cited

U.S. PATENT DOCUMENTS

| | | | | |
|---|---|---|---|---|
| 2,422,058 A | * | 6/1947 | Whinnery | H01P 3/123 333/239 |
| 2006/0152298 A1 | * | 7/2006 | Tong et al. | H01P 5/107 333/26 |
| 2013/0265733 A1 | * | 10/2013 | Herbsommer et al. | H01P 5/107 361/774 |
| 2017/0077609 A1 | * | 3/2017 | Risman et al. | H01Q 13/085 |

* cited by examiner

*Primary Examiner* — Benny T Lee
(74) *Attorney, Agent, or Firm* — Schwabe, Williamson & Wyatt, P.C.

(57) ABSTRACT

Embodiments disclosed herein include waveguides. In an embodiment, a waveguide comprises a conductive shell and a first ridge within the conductive shell. In an embodiment, the first ridge extends away from the conductive shell. In an embodiment, the waveguide further comprises a first core over the first ridge, where the first core comprises a first dielectric material with a first permittivity. In an embodiment, the waveguide may further comprise a second core embedded in the first core, where the second core comprises a second dielectric material with a second permittivity that is greater than the first permittivity.

25 Claims, 6 Drawing Sheets

WAVEGUIDES INCLUDING AT LEAST ONE RIDGE ASSOCIATED WITH AT LEAST ONE DIELECTRIC CORE AND THE WAVEGUIDES ARE SURROUNDED BY A CONDUCTIVE SHELL

TECHNICAL FIELD

Embodiments of the present disclosure relate to electronic packaging, and more particularly, to interconnects between electronic packages that are implemented with low dispersion and low loss waveguides.

BACKGROUND

In server architectures and high performance computing (HPC), the data links between components need to provide high speed transmission with low power consumption. Short interconnects (e.g., less than 1 meter) may be implemented with copper interconnects. However, copper interconnects are not suitable for longer interconnects, which are common in server architectures. In order to provide adequate speeds, optical interconnects may be used in such circumstances. However, optical interconnects (e.g., fiber optic cables) are expensive and have a high power consumption due to electrical-to-optical conversion. Due to these limitations, optical interconnects are not suitable for mid-range interconnect distances (e.g., 1 meter to 5 meters).

Accordingly, there has been significant interest in the use of dielectric waveguides to provide intermediate interconnect distances in server and HPC architectures. However, existing metal waveguides have significant group delay variation (i.e., dispersion) across their bandwidth compared to copper and optical interconnects. This limits the maximum data rate for single-channel transmission. Furthermore, amplitude equalization techniques from existing interconnect technologies are not energy efficient at correcting significant dispersion.

EMBODIMENTS OF THE PRESENT DISCLOSURE

Described herein are dielectric waveguides with low dispersion and low loss characteristics, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, dielectric waveguides are an attractive solution for mid-range interconnects (e.g., between approximately 1 meter and 5 meters). However, existing waveguides suffer from significant dispersion. This limits the useable bandwidth and limits the maximum data rate of such interconnects. Accordingly, embodiments disclosed herein include waveguides that comprise one or more ridges and a spatially-varying dielectric permittivity. Particularly, the use of one or more ridges provides reductions in dispersion by separating the first and second modes of the waveguide. This allows for the waveguide to be used further from the first mode cutoff, where the dispersion is lower, without incurring the second mode and corresponding modal dispersion. Spatially-varying dielectric permittivity provides a frequency dependent dielectric permittivity within the waveguide. This slows down the higher frequencies to reduce the group delay variation across the band. The combination of ridges with spatially-varying dielectric permittivity allows for significant dispersion reduction. For example, embodiments disclosed herein provide a reduction in dispersion by a factor of 30 or more as compared to a traditional metallic waveguide. In some embodiments, the dispersion may be reduced by a factor of 60 or more as compared to a traditional metallic waveguide.

The low dispersion characteristics of waveguides disclosed herein allow for an increase in the useable single-channel bandwidth. Large bandwidths enable single-channel operation. This provides significant reductions in complexity and footprint for a waveguide link. For example, when single-channel operation is not feasible, some form of frequency division multiplexing must be used. This requires a separate transmit and receive chain for each channel, generation of multiple local oscillator (LO) signals, and passive multiplexer with a size comparable to the wavelength's carrier frequency and stringent out-of-band rejection specifications.

Figure 1A:
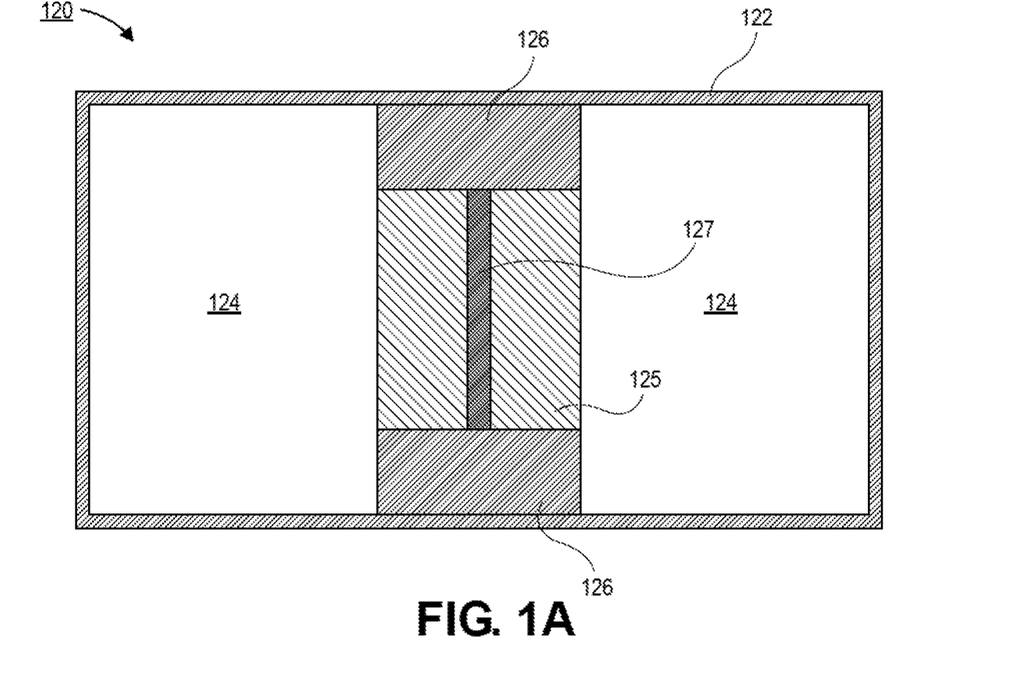
FIG. 1A is a cross-sectional illustration of a waveguide with ridges and a first core and a second core with different dielectric constants, in accordance with an embodiment.

Referring now to FIG. 1A, a cross-sectional illustration of a waveguide 120 is shown, in accordance with an embodiment. In an embodiment, the waveguide may comprise a shell 122. The shell 122 is a conductive material. The shell 122 may have any desired shape to propagate electromagnetic waves of a desired frequency. In a particular embodiment, the shell 122 may be sized to preferentially propagate electromagnetic radiation at frequencies between approximately 100 GHz and 200 GHz. In an embodiment, the shell 122 may have a substantially rectangular shape. For example, a width of the shell 122 may be greater than the height of the shell 122.

In an embodiment, the waveguide 120 may further comprise ridges 126. The ridges 126 may be conductive material that extends out from an interior surface of the shell 122. In the illustrated embodiment, the waveguide 120 comprises a first ridge 126 on a bottom interior surface of the shell 122 and a second ridge 126 on a top interior surface of the shell 122. While illustrated as distinct components, it is to be appreciated that in some embodiments the ridges 126 may be monolithically formed with the shell 122. In an embodiment, the ridges 126 may be substantially aligned with each other. That is a centerline of the first ridge 126 may be aligned with a centerline of the second ridge 126. In a particular embodiment, the ridges 126 may be substantially centered within the shell 122.

In an embodiment, the ridges 126 increase the frequency separation between the first and second modes of the waveguide. Additional separation allows for a wider bandwidth single-mode frequency band, avoiding multi-modal dispersion. Furthermore, as frequency relative to the first mode cutoff frequency increases, dispersion also reduces. As such, dispersion is minimized by operating the waveguide 120 as far from the first mode cutoff frequency as possible without operating above the second mode cutoff frequency.

Dispersion is further reduced by decreasing the velocity (increasing the group delay) of higher frequencies to match the slower speed of lower frequencies. Since propagation velocity is inversely proportional to the square root of permittivity, this can be accomplished by having a dielectric permittivity that increases with frequency across the single mode bandwidth of the waveguide. However, there are no low-loss materials which possess significant variation in dielectric permittivity over the millimeter wave spectrum.

Accordingly, embodiments disclosed herein isolate the high permittivity materials to the locations of the waveguide 120 where the high-frequency electric field is located. For example, for the first mode within a standard rectangular metal waveguide, the electric field is highest towards the lateral center of the waveguide. This is also true in the case of a waveguide 120 with ridges 126, such as those described herein. It can also be noted that as frequency increases, the electric field becomes more concentrated towards the lateral center of the waveguide 120. This implies that the dielectric permittivity near the lateral center of the waveguide cross-section will have more impact on the propagation velocity of higher frequencies. Accordingly, by providing a proper spatially-varying dielectric permittivity, with higher dielectric constants towards the lateral center of the waveguide 120, the desired reduction in dispersion may be obtained.

DETAILED DESCRIPTION OF THE PRESENT DISCLOSURE

Embodiments include a waveguide 120 that comprises a spatially-varying dielectric permittivity. That is, the dielectric permittivity within the shell 122 may be non-uniform. As shown in FIG. 1A, the interior of the shell 122 may comprise various regions of different dielectric materials. In a particular embodiment, the dielectric permittivity within the shell 122 increases towards the lateral center of the waveguide 120. For example, regions adjacent to the ridges 126 may comprise voided regions 124. The voided regions 124 may comprise air or a vacuum. The interior of the shell 122 may further comprise a first core 125 and a second core 127. The first core 125 and the second core 127 may be positioned between the ridges 126. For example, the first core 125 and the second core 127 may directly contact one or both of the ridges 126.

In an embodiment, the first core 125 may have a width that substantially matches a width of the ridge 126. In other embodiments, the width of the first core 125 may be less than a width of the ridge 126. The width of the second core 127 may be significantly smaller than the width of the first core 125. The second core 127 may be located in the lateral center of the waveguide 120. As described above, the second core 127 has a higher dielectric permittivity than the first core 125. In order to minimize losses associated with the high dielectric permittivity material of the second core 127, the width of the second core 127 may be minimized. As such, in some embodiments, the second core 127 has a width that is between approximately 5 µm and 50 µm. In a particular embodiment, the second core 127 has a width that is approximately 15 µm.

The second core 127 may be embedded within the first core 125. That is, the first core 125 may cover vertical sidewalls of the second core 127. In some embodiments the first core 125 may comprise a first sheet along one face of the second core 127 and a second sheet along the opposite face of the second core 127. For example, in some embodiments, the first core 125 may comprise two distinct sheets that are not connected to each other, and are separated from each other by the second core 127.

In an embodiment, the first core 125 is a dielectric material with a first dielectric permittivity, and the second core 127 is a dielectric material with a second dielectric permittivity. In an embodiment, the second dielectric permittivity is greater than the first dielectric permittivity. For example, the second dielectric permittivity (i.e., a relative permittivity) may be 6 or greater. In some embodiments, the second core 127 may comprise a ceramic-filled polytetrafluoroethylene (PTFE) material.

Figure 1B:
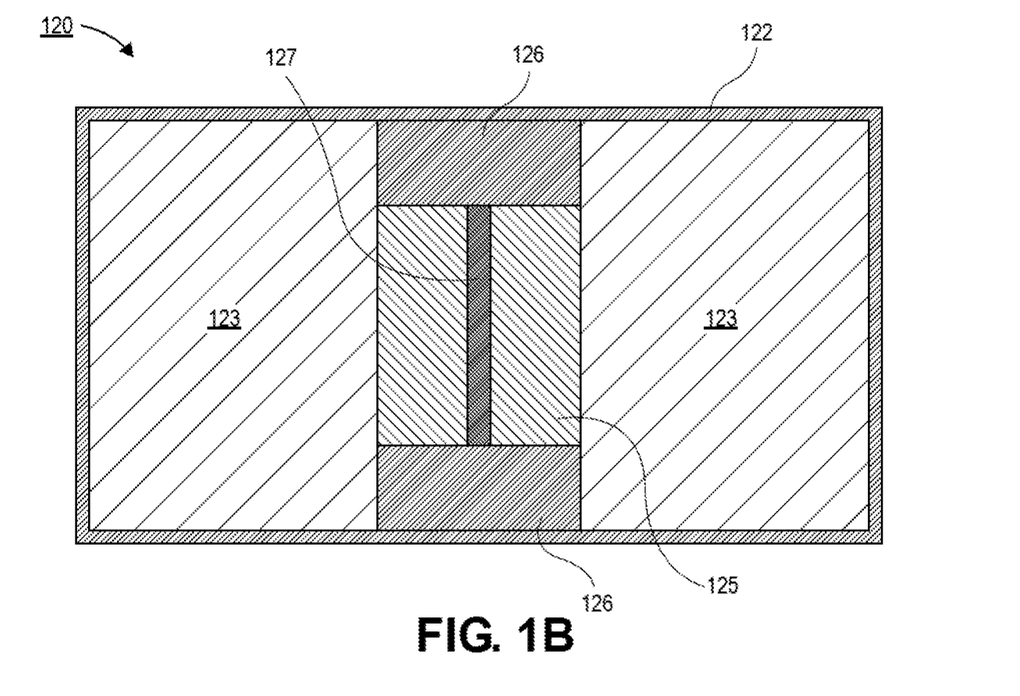
FIG. 1B is a cross-sectional illustration of a waveguide with ridges and a spatially-varying dielectric permittivity.

Referring now to FIG. 1B, a cross-sectional illustration of a waveguide 120 is shown, in accordance with an additional embodiment. In an embodiment, the waveguide 120 in FIG. 1B is substantially similar to the waveguide 120 in FIG. 1A, with the exception that the voided regions 124 (as shown in FIG. 1A) are replaced with a low-loss dielectric layer 123. In an embodiment, the dielectric layer 123 may have a relative permittivity that is lower than the relative permittivity of the first core 125. While the use of air or vacuum voided regions provide optimum loss characteristics, such a configuration may not be reliable. Particularly, since a large portion of the shell 122 in FIG. 1A is unsupported, there may be manufacturability or reliability issues, especially when the shell 122 is not rigid (e.g., when the shell 122 is a foil). Accordingly, the entire shell 122 may be supported by using the dielectric layer 123 to fill the entire interior volume of the shell 122 not occupied by the ridges 126, the first core 125, and the second core 127.

Figure 1C:
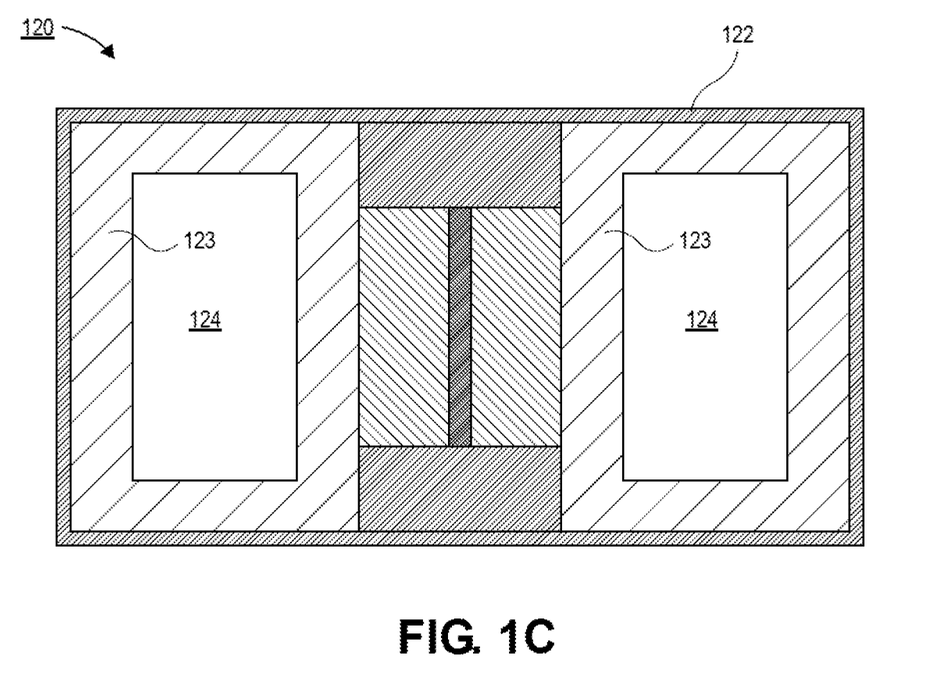
FIG. 1C is a cross-sectional illustration of a waveguide with ridges and spatially-varying dielectric permittivity including voids, in accordance with an embodiment.

Referring now to FIG. 1C, a cross-sectional illustration of a waveguide 120 is shown, in accordance with an additional embodiment. In an embodiment, the waveguide 120 in FIG. 1C is substantially similar to the waveguide 120 in FIG. 1B, with the exception that the dielectric layer 123 further comprises a voided region 124. In an embodiment, the voided regions 124 may comprise air or a vacuum. The inclusion of a voided region 124 reduces losses in the waveguide. In order to provide structural support, a shell of the dielectric layer 123 around the interior surfaces of the shell 122 is provided. The combination of the dielectric layer 123 with voided regions 124 provides improved performance (similar to that of the waveguide 120 in FIG. 1A) and improved manufacturability/reliability (similar to that of the waveguide 120 in FIG. 1B).

Figure 1D:
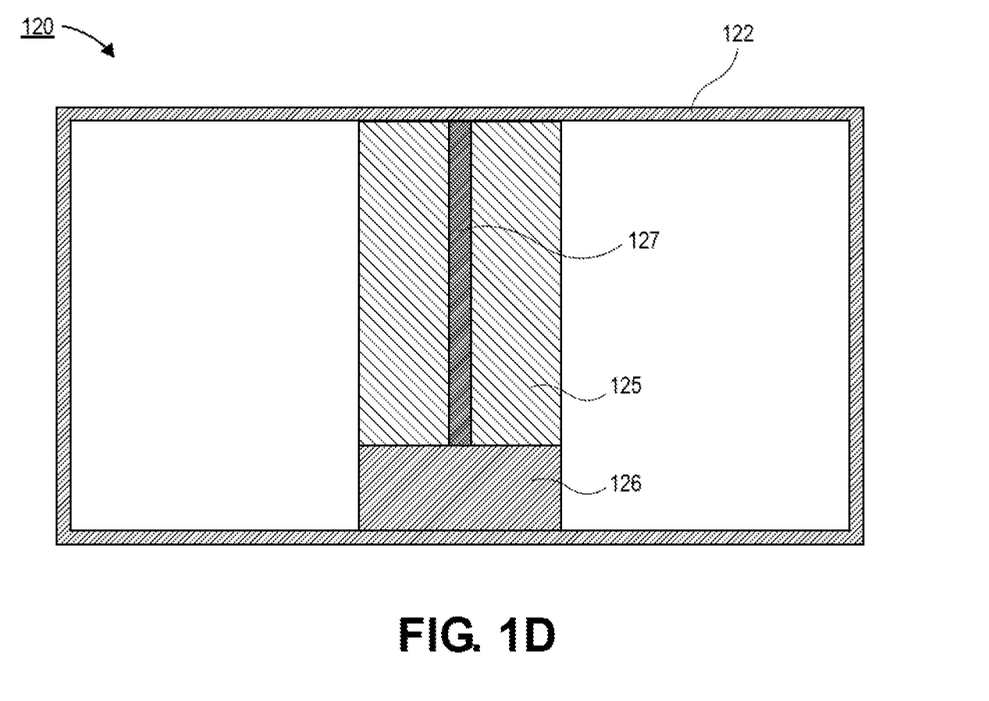
FIG. 1D is a cross-sectional illustration of a waveguide with a ridge, a first dielectric core, and a second dielectric core, in accordance with an embodiment.

Referring now to FIG. 1D, a cross-sectional illustration of a waveguide 120 is shown, in accordance with an additional embodiment. In an embodiment, the waveguide 120 in FIG. 1D is substantially similar to the waveguide 120 in FIG. 1A, with the exception that only a single ridge 126 is included in the shell 122. In such embodiments, the first core 125 and the second core 127 may be positioned between the ridge 126 and an opposing interior surface of the shell 122. In such embodiments, the first core 125 and the second core 127 may directly contact the shell 122.

Referring now to FIGS. 2A-2D, a series of illustrations depict waveguides 230 in accordance with additional embodiments. The waveguides 230 each include a ridge 231 and a void region 233 over the ridge 231. The use of a ridge 231 provides frequency separation between the first and second modes, similar to the ridges 126 described above with respect to FIGS. 1A-1D. However, the ridge 231 concentrates electric field in the gap between the ridge and the metal shell 222 near the top of the shell 222. This higher electric field leads to more loss in the structure due to both conductor and dielectric losses. While conductor losses cannot be completely avoided due to the structure, they can be minimized by reducing permittivity. Dielectric losses can be minimized by providing a lossless dielectric such as vacuum or air. To allow for a flexible, low-cost structure where the shell 222 is a foil wrapping, the majority of the cross-section must be filled with a solid, flexible dielectric fill material 223 that can support the forces of the wrapping and also maintain the shape of the waveguide 230 during nominal use. By providing a small void region 233 in the fill material 223, the foil shell can be supported, while the permittivity and losses in the critical region of electric field are minimized.

Figure 2A:
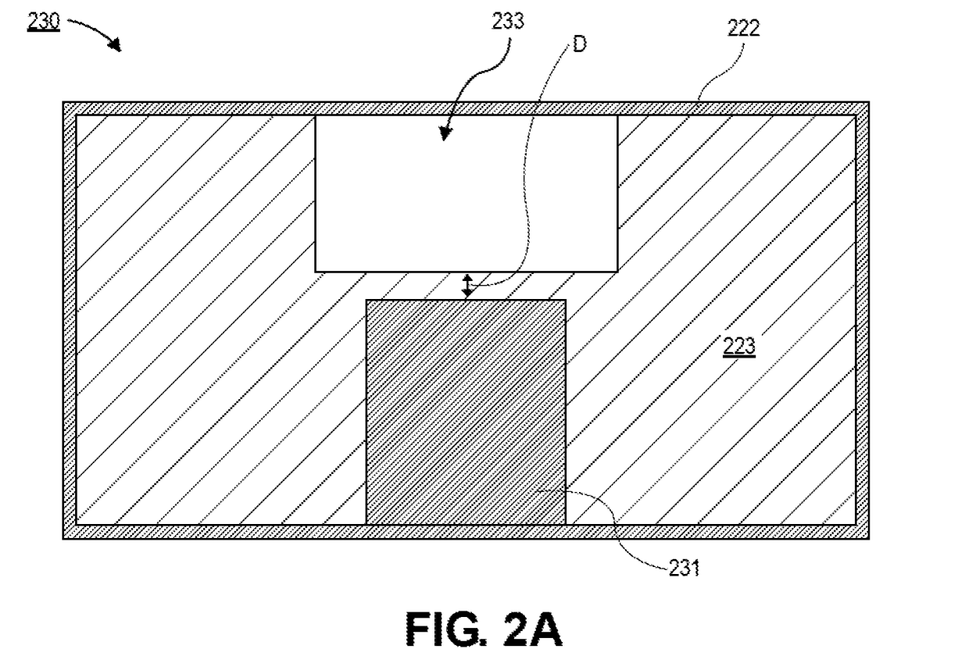
FIG. 2A is a cross-sectional illustration of a waveguide with a ridge and a void above the ridge, in accordance with an embodiment.

Referring now to FIG. 2A, a cross-sectional illustration of a waveguide 230 is shown, in accordance with an additional embodiment. In an embodiment, the waveguide 230 may comprise a shell 222. The shell 222 may comprise a conductive foil. For example, the conductive foil may comprise copper. The shell 222 may have a substantially rectangular cross section. For example, a width of the shell 222 may be greater than a height of the shell 222.

In and embodiment, the waveguide 230 may further comprise a ridge 231. The ridge 231 extends up from an interior surface of the shell 222. That is, the ridge 231 may be directly in contact with the shell 222. In some embodiments, the ridge 231 and the shell 222 may be a monolithic structure. The ridge 231 may be positioned in a substantially lateral center of the shell 222.

In an embodiment, the waveguide 230 may further comprise a dielectric fill layer 223. The fill layer 223 may substantially fill the interior of the shell 222. The fill layer 223 may extend over and contact sidewalls and a top surface of the ridge 231. The fill layer 223 provides structural integrity to the waveguide 230. That is, the shell 222 may be supported by the fill layer 223. In some embodiments, the fill layer 223 may comprise distinct films. For example, a first film of the fill layer 223 may be positioned on one side of the waveguide 230 and a second film may be positioned on the opposite side of the waveguide 230. The first film and the second film may contact each other above the ridge 231. In other embodiments, the fill layer 223 may comprise a single monolithic material.

In an embodiment, the waveguide 230 may further comprise a void region 233. The void region 233 may be above the ridge 231 where the electric field is highly concentrated. The void region 233 may comprise a low loss dielectric. For example, the void region 233 may be a vacuum or air. However, it is to be appreciated that the void region 233 may be any suitable low loss dielectric material. The void region 233 may be a dielectric material that has losses lower than the losses of the fill layer 223.

In an embodiment, the void region 233 may be any suitable dimension. In the illustrated embodiment, the void region 233 has a width that is greater than a width of the ridge 231. However, it is to be appreciated that the width of the void region 233 may also be smaller than the width of the ridge 231, or the same width as the ridge 231. A waveguide 230 with a larger width for the void region 233 may provide improved loss characteristics compared to a waveguide 230 with a smaller width for the void region 233. In some embodiments, the width of the void region 233 may be limited only by the need to structurally support the shell 222.

In an embodiment, the void region 233 may be entirely above the ridge 231. As shown in FIG. 2A, a bottom of the void region 233 may be spaced away from the top surface of the ridge 231 by a distance D. That is, in some embodiments, the ridge 231 may be entirely embedded with the fill layer 223.

Figure 2B:
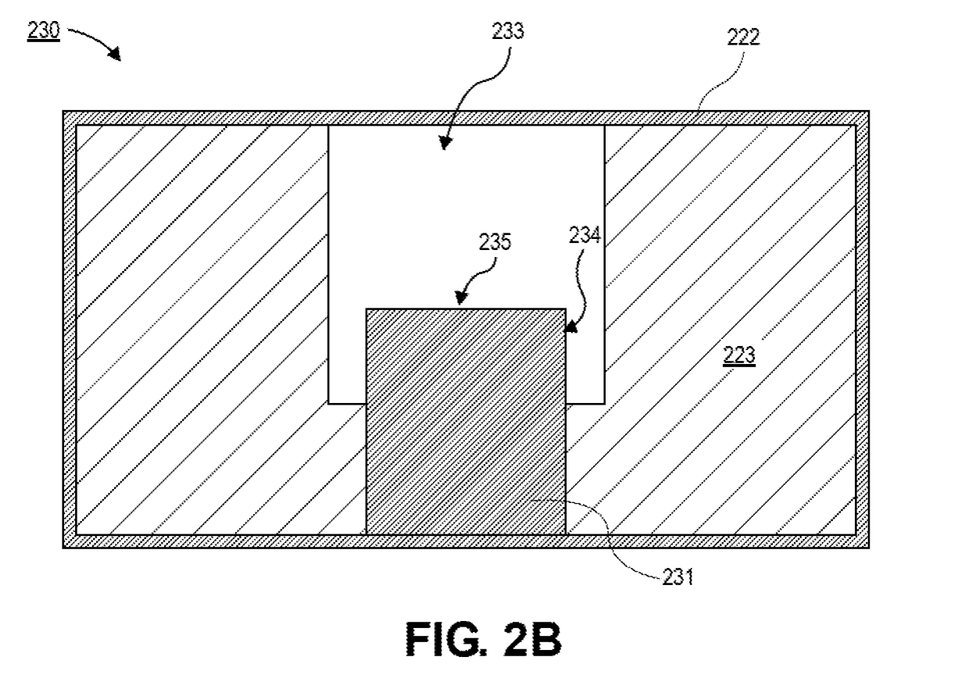
FIG. 2B is a cross-sectional illustration of a waveguide with a ridge and a void that extends down along sidewalls of the ridge, in accordance with an embodiment.

In other embodiments, the void region 233 may extend below a top surface of the ridge 231. Such an embodiment is shown in FIG. 2B. The waveguide 230 in FIG. 2B is substantially similar to the waveguide 230 in FIG. 2A, with the exception that the void region 233 extends below the top surface of the ridge 231. As shown, the ridge 231 extends up into the void region 233. Accordingly, a portion of the sidewalls 234 and the top surface 235 of the ridge 231 are not covered by the fill layer 223. Increasing the volume of the void region 233 further reduces the losses of the waveguide 230.

Figure 2C:
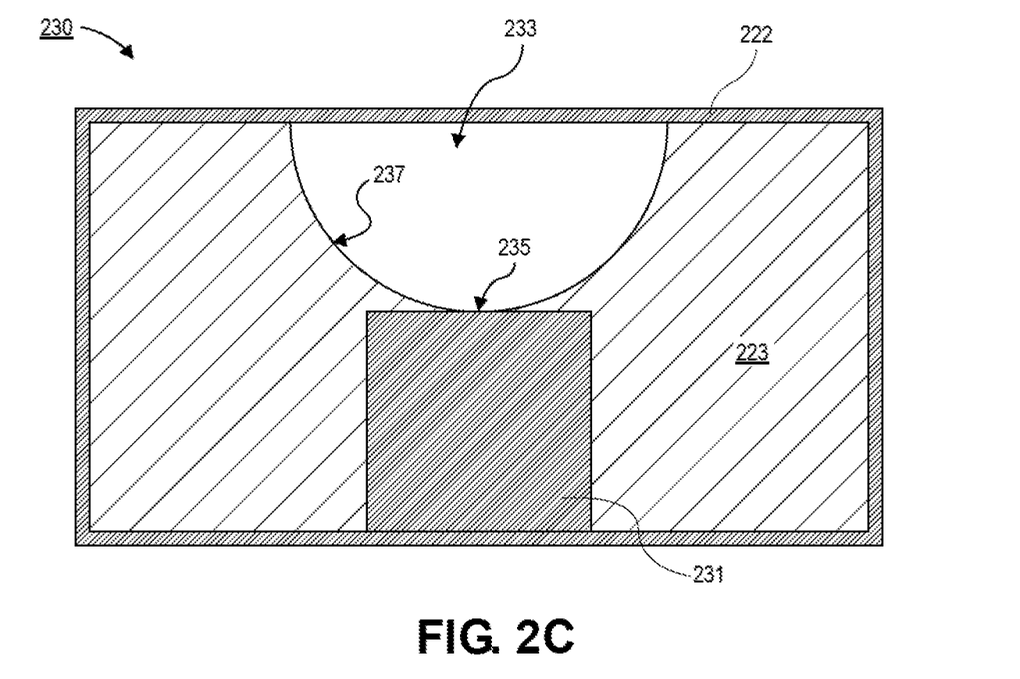
FIG. 2C is a cross-sectional illustration of a waveguide with a ridge and a void with non-vertical sidewalls, in accordance with an embodiment.

Referring now to FIG. 2C, a cross-sectional illustration of a waveguide 230 is shown, in accordance with an additional embodiment. The waveguide 230 in FIG. 2C is substantially similar to the waveguide 230 in FIG. 2A with the exception that the void region 233 is a different shape. Particularly, the void region 233 does not have vertical sidewalls. Instead, sidewalls 237 are curved. For example, the void region 233 may have a semicircular shape. However, it is to be appreciated that the sidewalls 237 may have any profile. In the illustrated embodiment, the void region 233 exposes a top surface 235 of the ridge 231. However, in other embodiments, the ridge 231 may be completely embedded by the fill layer 223.

Figure 2D:
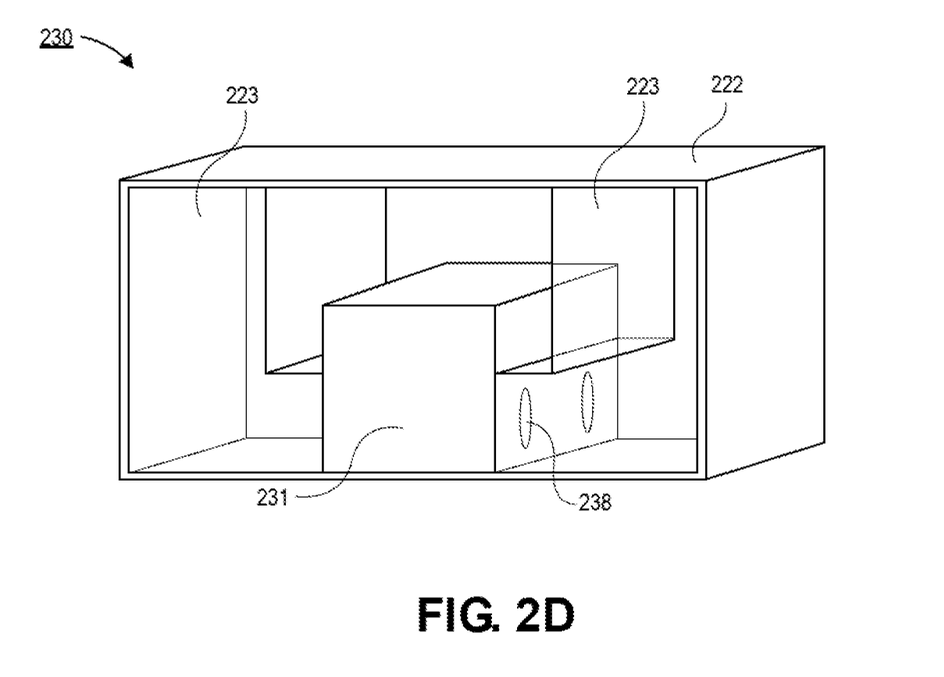
FIG. 2D is a perspective view of a waveguide with a ridge having openings through sidewalls of the ridge, in accordance with an embodiment.

Referring now to FIG. 2D, a perspective view illustration of a waveguide 230 is shown, in accordance with an additional embodiment. The waveguide 230 is substantially similar to the waveguide 230 in FIG. 2B, with the exception that the ridge 231 includes one or more openings 238. The openings 238 may extend through the ridge 231 from one sidewall of the ridge 231 to the opposing sidewall of the ridge 231. In an embodiment, the openings 238 may be filled with the fill layer 223. Such embodiments may allow for improved adhesion between the fill layer 223 and the ridge 231. In the illustrated embodiment, the openings 238 are shown as elliptical in shape. However, it is to be appreciated that the openings 238 may be any suitable shape.

Figure 3:
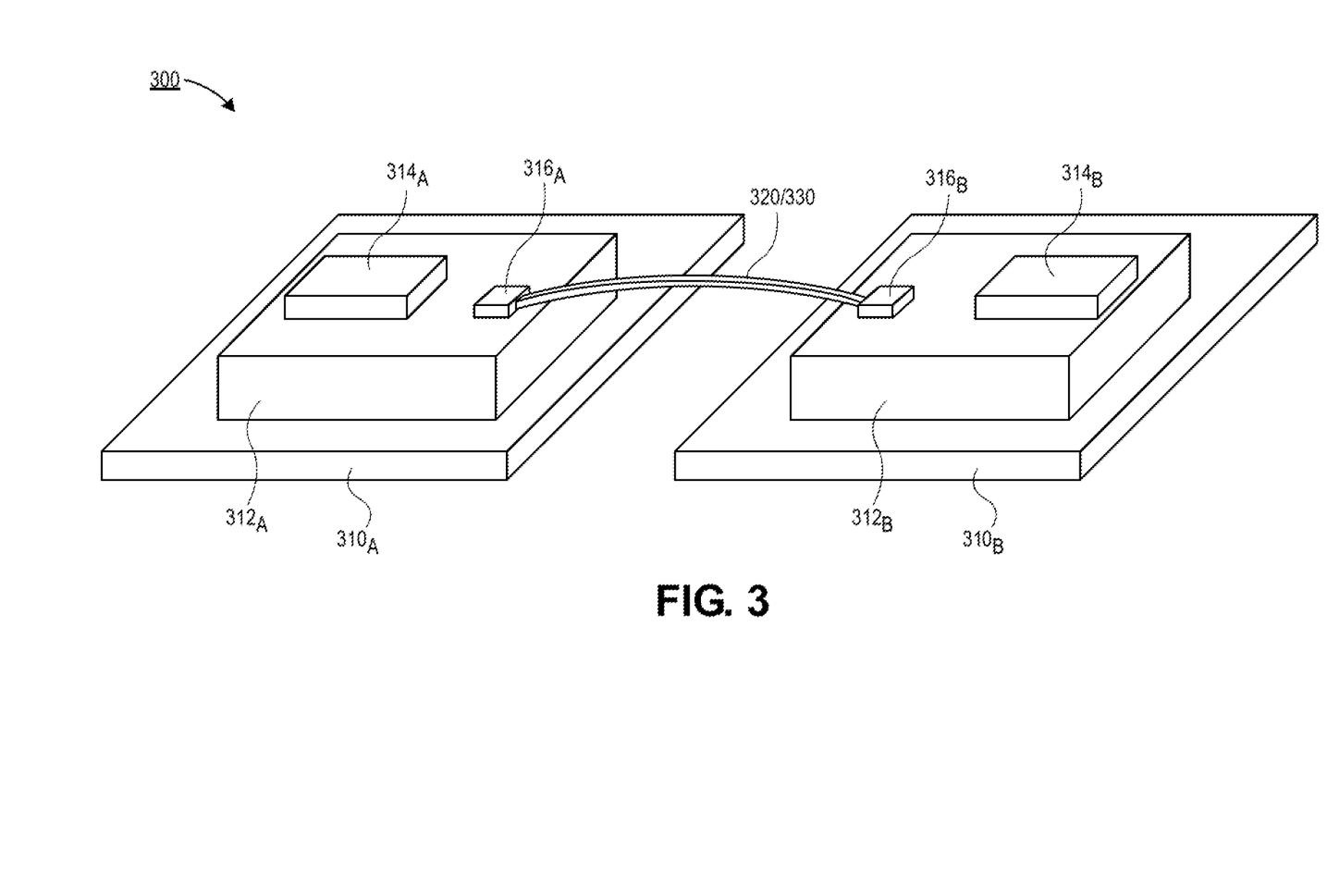
FIG. 3 is a perspective view of an electronic system that includes a waveguide that couples a first package to a second package, in accordance with an embodiment.

Referring now to FIG. 3, a perspective view illustration of an electronic system 300 that utilizes one or more waveguides 320/330 is shown, in accordance with an embodiment. In an embodiment, the waveguides may be substantially similar to waveguides 120 or waveguides 230 described above, with respect to FIGS. 1A-1D and FIGS. 2A-2D, respectively. Accordingly, embodiments include waveguides 320/330 that have low loss and/or low dispersion characteristics. In an embodiment, the waveguides 320/330 are mid-range interconnects. For example, the waveguides 320/330 may have a length that is between approximately 1 meter and approximately 5 meters.

In an embodiment, the electronic system 300 comprises a plurality of electronic packages that are interconnected by the waveguides 320/330. In the illustrated embodiment, a first electronic package comprising a package substrate 312A and a die 314A is coupled to a second electronic package comprising a package substrate 312E and a die 314B. While a single die 314 is shown on each package substrate 312, it is to be appreciated that each electronic package may comprise any number of dies 314. In some embodiments, the package substrates 312 may be coupled to a board 310A or 310E such as a printed circuit board (PCB). While each package substrate 312 is shown as being coupled to different boards 310, it is to be appreciated that more than one package substrate 312 can be attached to a single board 310.

In an embodiment, the waveguide 320/330 may be coupled between connectors $316_A$ and $316_B$. The connectors $316_A$ and $316_B$ may interface with the waveguide 320/330 and provide a transmitter and/or receiver (e.g., a transceiver) to propagate signals across the waveguide 320/330. In an embodiment, the connectors $316_A$ and $316_B$ may be electrically coupled to the dies $314_A$ and $314_B$. As such, die $314_A$ may be communicatively coupled to die $314_B$.

In an embodiment, the electronic system 300 may be a server system. In an embodiment, the first electronic package and the second electronic package may be within a single server rack. In other embodiments, the first electronic package and the second electronic package may be in different server racks. In other embodiments, the electronic system 300 may be a HPC.

Figure 4:
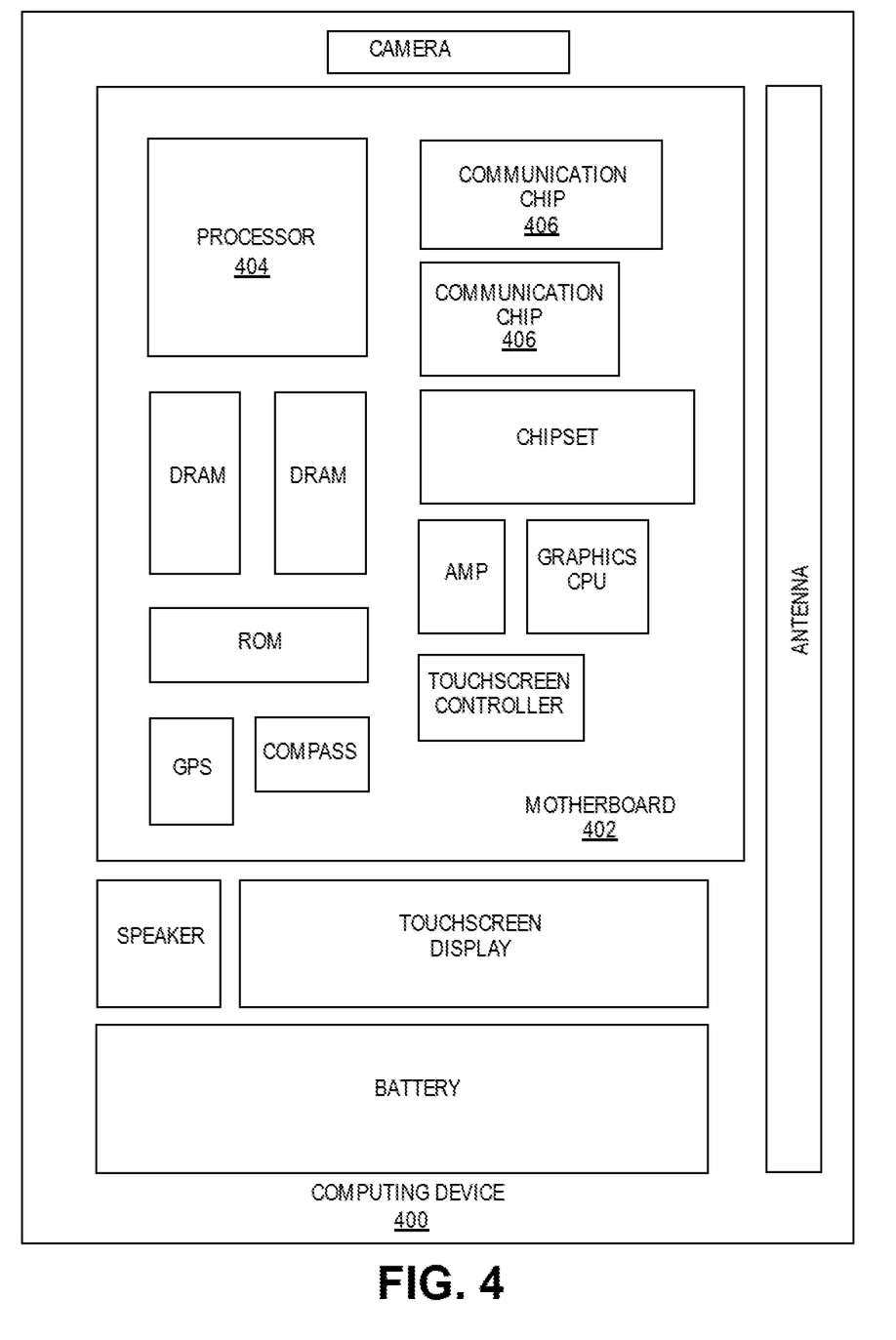
FIG. 4 is a schematic of a computing device built in accordance with an embodiment.

FIG. 4 illustrates a computing device 400 in accordance with one implementation of the invention. The computing device 400 houses a motherboard 402. The motherboard 402 may include a number of components, including but not limited to a processor 404 and at least one communication chip 406. The processor 404 is physically and electrically coupled to the motherboard 402. In some implementations the at least one communication chip 406 is also physically and electrically coupled to the motherboard 402. In further implementations, the communication chip 406 is part of the processor 404.

These other components include, but are not limited to, volatile memory (e.g., DRAM) (depicted), non-volatile memory (e.g., ROM) (depicted), flash memory (not depicted), a graphics processor (depicted), a digital signal processor (not depicted), a crypto processor (CPU) (not depicted), a chipset (depicted), an antenna (depicted), a display (not depicted), a touchscreen display (depicted), a touchscreen controller (depicted), a battery (depicted), an audio codec (not depicted), a video codec (not depicted), a power amplifier (AMP) (depicted), a global positioning system (GPS) device (depicted), a compass (depicted), an accelerometer (not depicted), a gyroscope (not depicted), a speaker (depicted), a camera (depicted), and a mass storage device (such as hard disk drive, compact disk (CD) (not depicted), digital versatile disk (DVD) (not depicted), and so forth).

The communication chip 406 enables wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid and/or non-conducting medium. The term does not imply that the associated devices do not contain any wires, although in some embodiments they might not. The communication chip 406 may implement any of a number of wireless standards or protocols, including but not limited to wireless fidelity (Wi-Fi) (IEEE 802.11 family), Worldwide Interoperability for Microwave Access (WiMAX) (IEEE 802.16 family), Mobile Broadband Wireless Access (IEEE 802.20), Long Term Evolution (LTE), Evolution-Data Optimized (Ev-DO), Evolved High Speed Packet Access (HSPA+), High Speed Downlink Packet Access (HSDPA+), High Speed Uplink Packet Access (HSUPA+), Enhanced Data Evolution (EDGE), Global System for Mobile communications (GSM), General Packet Radio Service (GPRS), Code-Division Multiple Access (CDMA), Time Division Multiple Access (TDMA), Digital Enhanced Cordless Telecommunications (DECT), BLUETOOTH (short range wireless technology), derivatives thereof, as well as any other wireless protocols that are designated as third generation (i.e. 3G), fourth generation (i.e. 4G), fifth generation (i.e. 5G), and beyond. The computing device 400 may include a plurality of communication chips 406. For instance, a first communication chip 406 may be dedicated to shorter range wireless communications such as Wi-Fi BLUETOOTH and a second communication chip 406 may be dedicated to longer range wireless communications such as GPS, EDGE, GPRS, CDMA, WiMAX, LTE, Ev-DO, and others.

The processor 404 of the computing device 400 includes an integrated circuit die packaged within the processor 404. In some implementations of the invention, the integrated circuit die of the processor may be packaged in an electronic system that comprises at least one interconnect that is implemented by a dielectric waveguide, in accordance with embodiments described herein. The term "processor" may refer to any device or portion of a device that processes electronic data from registers and/or memory to transform that electronic data into other electronic data that may be stored in registers and/or memory.

The communication chip 406 also includes an integrated circuit die packaged within the communication chip 406. In accordance with another implementation of the invention, the integrated circuit die of the communication chip may be packaged in an electronic system that comprises at least one interconnect that is implemented by a dielectric waveguide, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: a waveguide, comprising: a conductive shell; a first ridge within the conductive shell, wherein the first ridge extends away from the conductive shell; a first core over the first ridge, wherein the first core comprises a first dielectric material with a first permittivity; and a second core embedded in the first core, wherein the second core comprises a second dielectric material with a second permittivity that is greater than the first permittivity.

Example 2: the waveguide of Example 1, wherein a width of the first core is equal to or less than a width of the first ridge.

Example 3: the waveguide of Example 1 or Example 2, wherein a height of the first core is equal to a height of the second core.

Example 4: the waveguide of Examples 1-3, wherein the second core is substantially centered between sidewalls of the conductive shell.

Example 5: the waveguide of Examples 1-4, wherein a third dielectric material is adjacent to the first core.

Example 6: the waveguide of Example 5, wherein the third dielectric material completely fills the interior of the conductive shell adjacent to the first core.

Example 7: the waveguide of Example 5, wherein an opening is formed through the third dielectric material.

Example 8: the waveguide of Example 5 or Example 6, wherein the third dielectric material comprises air or a vacuum.

Example 9: the waveguide of Examples 1-8, further comprising: a second ridge, wherein the second ridge is aligned with the first ridge.

Example 10: the waveguide of Example 9, wherein the first core and the second core are positioned between the first ridge and the second ridge.

Example 11: the waveguide of Example 10, wherein the first core and the second core both contact the first ridge and the second ridge.

Example 12: the waveguide of Examples 1-11, wherein the second permittivity is a relative permittivity of 6 or greater.

Example 13: the waveguide of Examples 1-12, wherein the second core comprises a ceramic filled polytetrafluoroethylene (PTFE).

Example 14: a waveguide, comprising: a conductive shell; a ridge extending out from an interior surface of the conductive shell; a fill layer within the conductive shell, wherein the fill layer is a dielectric material; and a gap in the fill layer above the ridge, wherein a width of the gap is equal to or greater than a width of the ridge.

Example 15: the waveguide of Example 14, wherein the gap is entirely above the ridge.

Example 16: the waveguide of Example 14, wherein the gap extends down a sidewall surface of the ridge.

Example 17: the waveguide of Examples 14-16, wherein the gap is an air gap.

Example 18: the waveguide of Examples 14-17, further comprising: an opening passing between lateral sidewalls of the ridge.

Example 19: the waveguide of Example 18, wherein the fill layer fills the opening.

Example 20: the waveguide of Examples 14-19, wherein the gap has a non-vertical sidewalls.

Example 21: an electronic system, comprising: a first electronic package, wherein the first electronic package comprises a first transceiver; a second electronic package, wherein the second electronic package comprises a second transceiver; a waveguide that couples the first transceiver to the second transceiver, wherein the waveguide comprises: a conductive shell; a ridge extending from an interior surface of the conductive shell; and a dielectric core with a spatially-varying dielectric permittivity.

Example 22: the electronic system of Example 21, wherein the spatially-varying dielectric permittivity has a higher dielectric constant towards a lateral center of the waveguide.

Example 23: the electronic system of Example 22, wherein the dielectric core comprises: a first core over the ridge, wherein the first core comprises a first dielectric material with a first permittivity; and a second core embedded in the first core, wherein the second core comprises a second dielectric material with a second permittivity that is greater than the first permittivity.

Example 24: the electronic system of Examples 21-23, further comprising: a gap in the dielectric core above the ridge.

Example 25: the electronic system of Example 24, wherein the gap extends down a sidewall surface of the ridge.

What is claimed is:
1. A waveguide, comprising:
   a conductive shell;
   a first ridge within the conductive shell, wherein the first ridge extends away from the conductive shell;
   a first core over the first ridge, wherein the first core comprises a first dielectric material with a first permittivity; and
   a second core embedded in the first core, wherein the second core comprises a second dielectric material with a second permittivity that is greater than the first permittivity, wherein the conductive shell laterally surrounds and encloses the first ridge, the first core, and the second core within the conductive shell.

2. The waveguide of claim 1, wherein a width of the first core is less than a width of the first ridge.

3. The waveguide of claim 1, wherein a height of the first core is equal to a height of the second core.

4. The waveguide of claim 1, wherein the second core is substantially centered between sidewalls of the conductive shell.

5. The waveguide of claim 1, wherein a third dielectric material is adjacent to the first core.

6. The waveguide of claim 5, wherein the third dielectric material completely fills the interior of the conductive shell adjacent to the first core.

7. The waveguide of claim 5, wherein an opening is formed through the third dielectric material.

8. The waveguide of claim 5, wherein the third dielectric material comprises air or a vacuum.

9. The waveguide of claim 1, further comprising:
   a second ridge, wherein the second ridge is vertically aligned with the first ridge.

10. The waveguide of claim 9, wherein the first core and the second core are positioned between the first ridge and the second ridge.

11. The waveguide of claim 10, wherein the first core and the second core both contact the first ridge and the second ridge.

12. The waveguide of claim 1, wherein the second permittivity is a relative permittivity of 6 or greater.

13. The waveguide of claim 1, wherein the second core comprises a ceramic filled polytetrafluoroethylene (PTFE) material.

14. A waveguide, comprising:
a conductive shell;
a ridge extending out from an interior surface of the conductive shell;
a fill layer within the conductive shell, wherein the fill layer is a dielectric material; and
a gap in the fill layer above the ridge, wherein the conductive shell laterally surrounds and encloses the ridge, the fill layer, and the gap within the conductive shell.

15. The waveguide of claim 14, wherein the gap is entirely above the ridge.

16. The waveguide of claim 14, wherein the ridge has a sidewall surface, and wherein the gap extends down the sidewall surface of the ridge.

17. The waveguide of claim 14, wherein the gap is an air gap.

18. The waveguide of claim 14, further comprising:
an opening passing between lateral sidewalls of the ridge.

19. The waveguide of claim 18, wherein the fill layer fills the opening.

20. The waveguide of claim 14, wherein the gap has a non-vertical sidewall.

21. An electronic system, comprising:
a first electronic package, wherein the first electronic package comprises a first transceiver;
a second electronic package, wherein the second electronic package comprises a second transceiver;
a waveguide that couples the first transceiver to the second transceiver, wherein the waveguide comprises:
a conductive shell;
a ridge extending from an interior surface of the conductive shell; and
a dielectric core with a spatially-varying dielectric permittivity, wherein the conductive shell laterally surrounds and encloses the ridge and the dielectric core within the conductive shell.

22. The electronic system of claim 21, wherein the spatially-varying dielectric permittivity has a higher dielectric constant towards a center of the waveguide.

23. The electronic system of claim 22, wherein the dielectric core comprises:
a first core disposed over the ridge, wherein the first core comprises a first dielectric material with a first permittivity; and
a second core embedded in the first core, wherein the second core comprises a second dielectric material with a second permittivity that is greater than the first permittivity.

24. The electronic system of claim 21, further comprising:
a gap in the dielectric core above the ridge.

25. The electronic system of claim 24, wherein the ridge has a sidewall surface, and wherein the gap extends down the sidewall surface of the ridge.

* * * * *